United States Patent [19]
Minch

[11] Patent Number: 5,309,717
[45] Date of Patent: May 10, 1994

[54] RAPID SHAPE MEMORY EFFECT MICRO-ACTUATORS

[76] Inventor: Richard B. Minch, 15410 N.E. 144th Pl., Woodinville, Wash. 98072

[21] Appl. No.: 34,113

[22] Filed: Mar. 22, 1993

[51] Int. Cl.$^5$ .............................................. F03G 7/06
[52] U.S. Cl. .......................................... 60/527; 165/47
[58] Field of Search .................. 60/527, 528, 529; 165/47, 47 H, 32

[56] References Cited

U.S. PATENT DOCUMENTS

| | | | |
|---|---|---|---|
| 4,434,618 | 3/1984 | Dillon | 60/528 |
| 4,551,975 | 11/1985 | Yamamoto et al. | 60/528 |
| 4,553,393 | 11/1985 | Ruoff | 60/527 |
| 4,559,512 | 12/1985 | Yaeger et al. | 60/527 |
| 4,716,731 | 1/1988 | Sakai et al. | 60/527 |
| 4,736,587 | 4/1988 | Suzuki | 60/528 |
| 4,932,210 | 6/1990 | Julien et al. | 60/528 |
| 5,079,920 | 1/1992 | Whitehead et al. | 60/528 |
| 5,127,228 | 7/1992 | Swenson | 60/527 |

Primary Examiner—Tony M. Argenbright
Assistant Examiner—M. Macy

[57] ABSTRACT

Rapid internal cooling of shape memory effect material actuators during cooling portion of thermal cycle by means of embedded micro-heat pipes enables one, two and three dimensional actuators comprised of composite structures with rapid response times. Structures are able to operate in high-temperature environments, have low thermal hysteresis, have improved positional control for robotics applications and enable large scale shape memory effect material actuators with rapid response characteristics.

19 Claims, 6 Drawing Sheets

RAPID SHAPE MEMORY EFFECT MICRO-ACTUATORS

REFERENCES CITED
U.S. PATENT DOCUMENTS

| 4,553,393 | 11/1985 | Ruoff | 60/528 |
|---|---|---|---|
| 4,716,731 | 1/1988 | Sakai, et al | 60/527 |
| 4,830,262 | 5/1989 | Ishibe | 228/156 |
| 4,976,308 | 12/1990 | Faghri | 165/10 |
| 5,011,545 | 4/1991 | Ikeda, et al | 148/11.5F |
| 5,114,104 | 5/1992 | Cincotta | 244/219 |

OTHER PUBLICATIONS

Cotter, T. P. "Principles and Prospects of Micro Heat Pipes", Proceedings of the 5th International Heat Pipe Conference, JaTech, Tokyo, 1984, pp. 328-335.

Peterson, G. P. "Overview of Micro Heat Pipe Research and Development", Applied Mechanics Reviews, vol. 45, No. 5, May 1992 pp. 175-189.

Dunn, P. and Reay, D. A., "Heat Pipes", 2nd Ed., Pergamon Press (1978).

FIELD OF THE INVENTION

This invention relates to the rapid cooling of shape memory effect material micro-actuators by means of embedded micro-heat pipes, whereby rapid micro-actuator responses are achieved, and their use within actuated devices and structures.

BACKGROUND AND DESCRIPTION OF THE PRIOR

Thermal actuators are devices that convert thermal energy into mechanical energy by sensing changes in temperature and reacting to these changes by exerting a force or bending moment. This invention relates to the cooling of certain materials termed shape memory effect (SME) materials which are able to remember a previous shape and thereby operate as thermal actuators to generate force or motion.

"Shape memory effect" (SME) is a term that describes the ability of some materials which when deformed relatively easily below a first temperature are able to recover their original shape, while exerting substantial stress, when subsequently heated above a second higher temperature. This property is associated with the appearance and disappearance of a particular crystal structure within the material termed martensite. Martensite is generated by cooling the shape memory effect material below the martensitic finish temperature $M_f$ where it is all martensite. The shape memory effect material is all austenite above the austenitic finish temperature $A_f$. When deformed while below the martensitic finish temperature and then heated to above the austenitic temperature, the alloy returns to its shape existing before the deformation. This invention is concerned with rapidly cooling actuators fabricated from shape memory effect materials during the cooling portion of the thermal/mechanical cycle, that is, when the actuator is returned from the austenitic state to the martensitic state.

In summary the shape memory effect means that after deforming the shape memory effect material below a first temperature $M_f$ where its structure is martensite, the shape memory material will exert substantial force in recovering, fully or partially, its original shape on subsequent heating over a second higher temperature.

Many metals, plastics and ceramics are known to exhibit the shape memory effect. The extensive list of metal alloys include the copper alloy systems of Cu—Zn, Cu—Al, Cu—Au, Cu—Sn and the many ternary alloys formed from these binary alloy systems by adding a third element. Among others, the alloys of Au—Cd, Ni—Al, Fe—Pt, Ti—Pd, In—Tl, Fe—Pd, Mn—Cu and their ternary alloys, exhibit the shape memory effect. A shape memory effect alloy with exceptional properties is a nickel-titanium alloy known as Nitinol, which is based on equiatomic weights of Ti and Ni. There is also an extensive list of ternary alloys based upon adding a third element to the nickel-titanium binary system. Ni—Ti alloys are able to completely recover from two percent to as high as ten percent of plastic strain, depending on desired fatigue life, by heating above the austenitic finish temperature $A_f$ while yielding forces and/or moments based upon the creation of internal stresses on the order of 100,000 psi.

The use of thermal actuators offers several advantages including high force levels, large movements, small size, multiple actuation modes (linear, bending, torsion and combined), high work performance per unit volume and per unit weight and motion completed in a narrow temperature range. This invention anticipates all of these advantages from an internally cooled shape memory effect material micro-actuator.

The shape memory effect alloys cited above and the multiplicity of additional materials are per se known for their shape memory effect and are included under the scope and spirit of this invention.

The shape memory effect has been applied to a wide variety of applications, many of which make use of its shape recovery mechanism for actuation purposes. Actuators can take many configurations, including but not limited to tensile, cantilever, torsional, helical or combinations thereof.

As an example of SME material actuator operation, typical tensile and cantilever actuators employ a SME material member and a return bias spring mechanically connected in some manner to the SME material device. When such a SME material device is heated, by Joule heating or some other means, the SME material member contracts to perform a work function. The bias spring returns the actuator to its original position after cooling. This invention anticipates this by incorporating the bias spring as an integral part of the microactuator as the resilient component of a composite material in mechanical communication with the shape memory material component.

A second type of actuator, called a differential type, uses two SME material actuators connected in mechanical series whereby heating of one actuator shrinks the combined apparatus in one direction while heating of the second actuator shrinks the apparatus in the opposing direction.

The above embodiments are the uni-directional mode of operation of the SME material actuator wherein the shape memory effect appears only upon heating. The present invention is not limited to this type but is also envisaged to include the bi-directional type wherein the SME material is trained to operate in one, two or three dimensional directions without aid of biasing members. Such training techniques are known in the shape memory effect materials art.

Joule heating, that is passing an electrical current through the SME material member, is the preferred heating choice because Joule heating is relatively uniform throughout the member cross-section. This type of heating causes a rapid temperature rise and therefore a rapid transformation between the martensitic and austenitic crystal forms. This results in a rapid and accurate actuator response. However, this invention envisages other methods of heating including, but not limited to, heating by radiation, conduction or convection.

Current methods of external cooling of a SME material actuator are much slower because heat from the center of the actuator cross-section must diffuse to the surface. This is a relatively slow process. This process is in series with a second mechanism to remove the heat from the surface to the surroundings which has a small heat transfer coefficient at the low temperatures at which SME materials operate. The rate of cooling is limited by the ratio of surface area, as measured by the perimeter of the cross-section, to the volume, as measured by the area of the cross-section of the actuator. This ratio of surface to volume decreases inversely as the diameter of the actuator increases, meaning that the larger the actuator diameter the slower it cools and therefore the slower is the actuator's response. This is exacerbated by the martensitic transformation being diffusion less and progressing so fast that it is essentially adiabatic. Thus the heat of transformation adds to the heat load that must be removed from the center of the actuator through the surface. All of these and other factors combine to limit the rate of cooling of shape memory effect actuators by current cooling methods and therefore lengthen their response times. This is the major reason why useful shape memory effect material actuators are currently limited to small diameters.

Considering all of the above limitations to the current state of the art, it is therefore desirable to cool shape memory effect (SME) material micro-actuators internally using a mechanism capable of transporting large heat fluxes per unit area. This invention relates to using micro-heat pipes as a means of heat removal from the interior of SME material actuators.

Heat pipes are devices that are able to carry very large heat fluxes by utilizing the heat of vaporization of a fluid. A specified amount of fluid is sealed within an elongated enclosure with the heat flux entering through the enclosure wall at one end, termed the evaporator, causing evaporation of the fluid. The resulting vapor phase travels the length of the enclosure via a central vapor space, and condenses on the cooler opposite end of the enclosure where the heat of condensation is removed to the outside through the enclosure wall. The liquid phase is returned to the evaporator end by capillary action via either arteries contained within the enclosure walls or via fine mesh wick structure lining the walls of the enclosure and may be any shape or geometry. Alternatively, the liquid phase can be returned by gravity flow. Gravity flow types of micro-heat pipes are also termed thermosyphons. This invention relates to embedding one or multiple micro-heat pipes in the interior cross-section of shape memory effect material actuators to achieve short actuator response times. A micro-heat pipe may have multiple evaporator and condenser regions whereby adjacent regions of opposite type are in thermal and fluidic communication.

In Cotter's original proposal, "micro" is defined in the art to be a heat pipe small enough that the mean curvature of the vapor-liquid interface is comparable in magnitude to the reciprocal of the hydraulic radius of the total flow channel. In practice, this translates into an enclosure with an internal vapor space channel with an approximate diameter of 100 to 1000 micro-meters.

The temporal response of micro-heat pipes is very fast relative to other forms of cooling. However, it is not as fast as Joule heating. This invention envisages a temporal relationship between Joule heating and micro-heat pipe cooling which serves to minimize heat loss during the heating portion of the SME material actuator thermal cycle. During the heating portion of the thermal cycle the onset of micro-heat pipe operation is delayed which accommodates the time needed to complete the heating portion of the SME material actuator cycle. Once started, after an initial delay, the rate of micro-heat pipe cooling is extremely rapid. Other forms of cooling, for example convective cooling, cause inefficiencies due to the removal of heat by the cooling means during the heating portion of the thermal cycle. The present invention avoids this and thereby avoids expensive means of alternatively turning off the cooling means during the heating portion of the thermal cycle. This is important, for example, in robotics applications where precise locational control is important. Uncertainty in heating or cooling results in uncertainty in robotic location.

Because shape memory effect material actuators currently must be cooled through their exterior surface, the environments into which they may be placed are limited to relatively low temperatures and have relatively high thermal conductivities. They cannot, for instance, be embedded into insulative materials such as advanced composites without suffering severe time response degradation. This is due to the extra time required for heat to dissipate from the actuators during the cooling portion of the shape memory effect material thermal cycle. See U.S. Pat. No. 5,114,104 to Cincotta et al for such an application to control surfaces in which cooling is inadequate. This invention solves these problems by providing for internal cooling wherein the operation of the SME material actuator becomes indifferent to the environment into which it is placed. Thus this invention relates to rapidly actuated members constructed from composite materials comprising a low thermal conductivity matrix.

Internally cooled SME material micro-actuators embedded into a second material in one, two or three dimensional arrays can serve to change the external shape of the composite body. The second material can be made from an electrically insulative material so that Joule heating may be used to heat the SME micro-actuators. The SME micro-actuators can be trained to assume one shape on heating and another on cooling as is known in the art. Alternatively, a resilient member can be employed to return the composite material to a second shape upon cooling when the shape memory effect material is in its martensitic state. Such a resilient member can be made a part of the SME material micro-actuator or can be the second material into which the SME material micro-actuators are embedded as is envisaged in this invention. Such one, two and three dimensional SME micro-actuator composite structures would be useful for fluid control surfaces, adaptive optic surfaces and robotics.

Currently shape memory actuators cannot operate in an environment with a temperature higher than the austenitic finish temperature $A_f$, and don't operate well in environmental temperatures above the martensitic finish temperature $M_f$. Shape memory effect materials have relatively low transformation temperatures, Ni—Ti and Cu—Zn—Al, for example having transformation temperatures between −200°0 C. and +120° C., this severely limits the application of actuators fabricated from currently available shape memory effect materials to low temperature environments. Because the present invention is internally cooled, these limitations can be eliminated by placing a second heat-resisting material around the actuator and cooling it internally. Alternatively, a plurality of SME material micro-actuators containing one or multiple micro-heat pipes can be embedded into a matrix material with the composite structure able to be actuated in one, two or three dimensions while exposed to a high temperature environment.

Additionally, the thermal gradients between the interior and surface of SME material actuators resulting from surface cooling methods leads to increased hysteresis and to the degradation of the SME material's thermal stress fatigue life. Hysteresis is manifest in the temperature difference measured between the temperature at which the transformation of the shape memory material (SME) from austenite to martensite starts upon cooling, termed the $M_s$ temperature, and the temperature at which the reverse transformation from martensite to austenite starts, termed the $A_s$ temperature, on subsequent heating. A large hysteresic temperature difference limits the accuracy of an actuator. A large temperature gradient across the shape memory actuator cross-section leads to thermal stress fatigue and failure. Placing the cooling means in the interior, as does this invention, reduces this temperature gradient and improves the fatigue and hysteresis characteristics.

OBJECTS AND ADVANTAGES

Accordingly, besides the objects and advantages of the invention described above, several objects and advantages of the present invention are:

(a) to provide a method for the rapid cooling of micro-actuators, fabricated from shape memory effect materials, via internal micro-heat pipes, either singularly or distributed within a cross-section of an actuator so that short actuator response times are achieved;

(b) to provide shape memory effect material actuators capable of one, two or three dimensional shape change by controlling the temperature of it it internal shape memory effect material components;

(c) to provide large cross-sectional actuators, capable of exerting large force levels, while still having fast response times which are made of shape memory effect materials with a plurality of micro-heat pipes embedded into an array within the actuator's cross-section;

(d) to provide a shape memory effect material micro-actuator with reduced temperature hysteresis thereby providing improved precision in actuator control;

(e) to provide a shape memory effect material micro-actuator able to operate in environmental temperatures above those where shape memory effect materials are currently able to operate;

(f) to provide a shape memory effect material micro-actuator with improved thermal stress fatigue properties;

(g) to provide a micro-actuator which has a resilient member of a second material integrally bonded and in mechanical communication with a SME material micro-actuator containing one or multiple micro-heat pipes as a micro-actuator composite structure;

(h) to provide a micro-actuator with reduced heat losses during the heating portion of the thermal cycle of a SME material actuator and thereby improve actuator efficiency;

(i) to provide a SME material actuated composite material with rapid temporal response also comprising a low thermal conductivity material matrix;

(j) to provide a SME material micro-actuator with alternating condenser and evaporator regions of embedded micro-heat pipe for distributed shape memory control.

Still further objects and advantages Will become apparent from a consideration of the ensuing specification and drawings.

REFERENCE NUMERAL IN DRAWINGS 10 shape memory effect micro-actuator
10A shape memory effect micro-actuator assembly
10B actuator with resilient member
12 resilient member
12A matrix material
12B protective sheath/resilient member
14 body
16 vapor space
18 capillary artery
20 shape memory effect micro-actuator
20A shape memory effect micro-actuator assembly
20B actuator with resilient member
22A matrix material
22B protective sheath/resilient member
24 body
26 vapor space
28 capillary artery
30 shape memory effect micro-actuator 34 body
36 vapor space
38 capillary artery
40, 40' sealed ends
42 evaporator region
44 adiabatic region
46 condenser region
52 evaporator region
56, 56' condenser regions
60 tensile force
62 cantilever/shear force
64 torque force
66 grasping means

DESCRIPTION OF THE INVENTION

Figure 1:
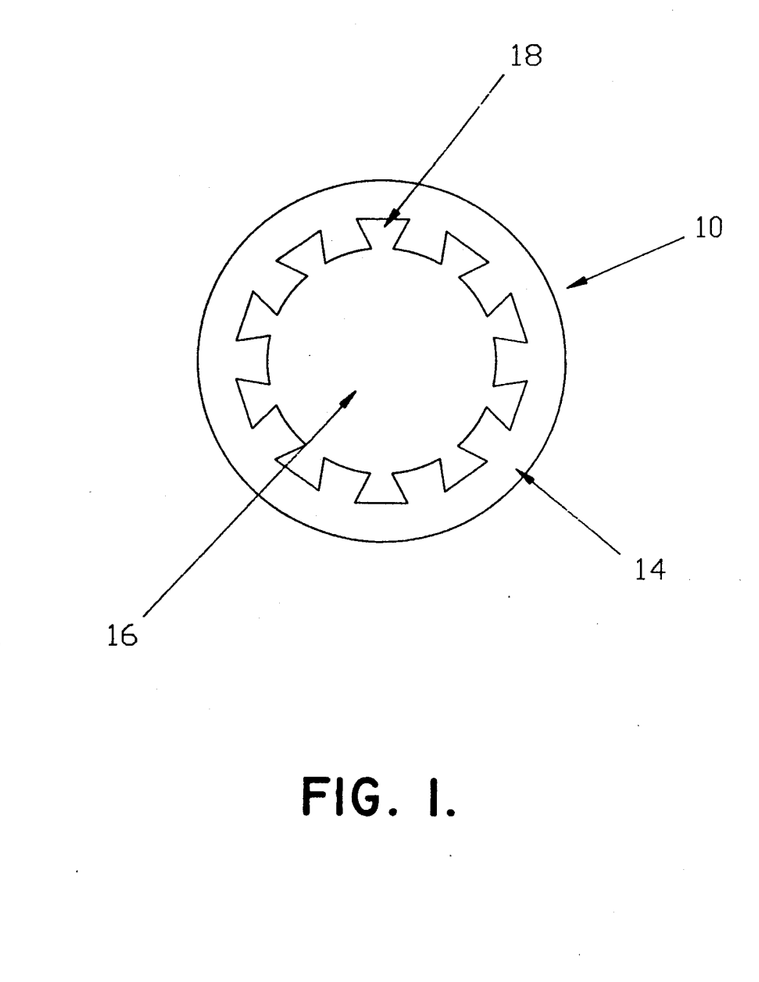
FIG. 1 is a cross-section of a circular micro-actuator made from a shape memory effect material containing an micro-heat pipe.

A typical embodiment of the invention is shown in FIG. 1. The transverse cross-section of the micro-heat pipe cooled shape memory effect micro-actuator 10 has a body 14 fabricated from a shape memory effect material, containing a vapor space 16 running normal to the cross-sectional plane, the vapor space having at least one capillary 18 located around its perimeter in fluid connection with each other and running essentially parallel to the principal axis of the vapor space 16. It is generally desirable that capillary arteries 18 be narrower at their interface with vapor space 16, while at the same time having sharp interstices such as interior corners along the side furthest from vapor space 16, as shown in FIG. The shape and multiplicity of the capillary arteries 18 can assume many configurations and one skilled in the heat pipe art could make alterations which would be within the intent and spirit of this invention.

Figure 2:
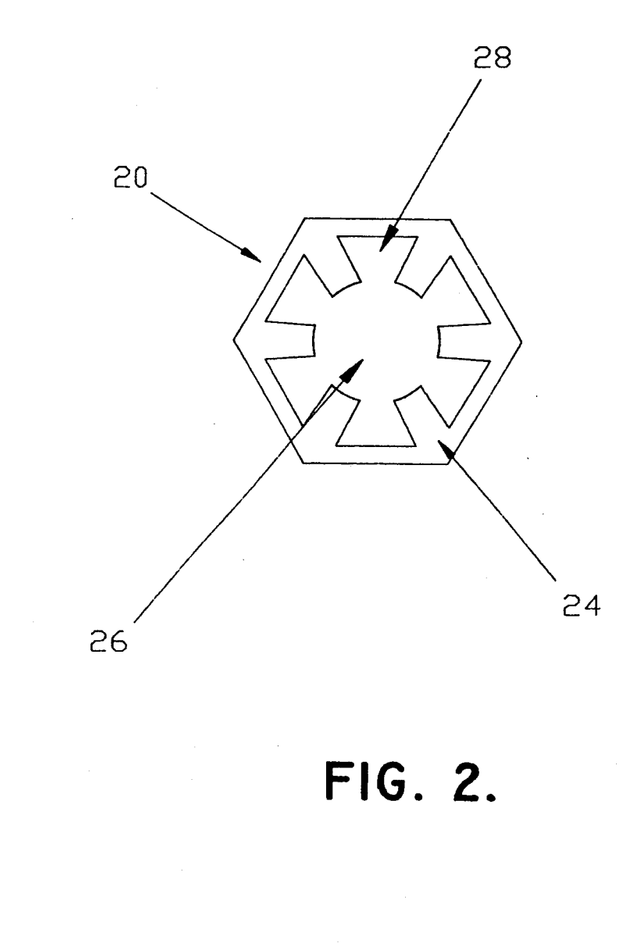
FIG. 2 is a cross-section of a hexagonal micro-actuator made from a shape memory effect material containing a micro-heat pipe.

FIG. 2 shows a transverse cross-section of a second embodiment of the micro-heat pipe cooled shape memory effect micro-actuator 20, according to the present invention, which has a body 24 fabricated from a shape memory effect material, containing a vapor space 26 running normal to the cross-sectional plane, vapor space 26 having at least one capillary artery 28 located around its perimeter.

Figure 3:
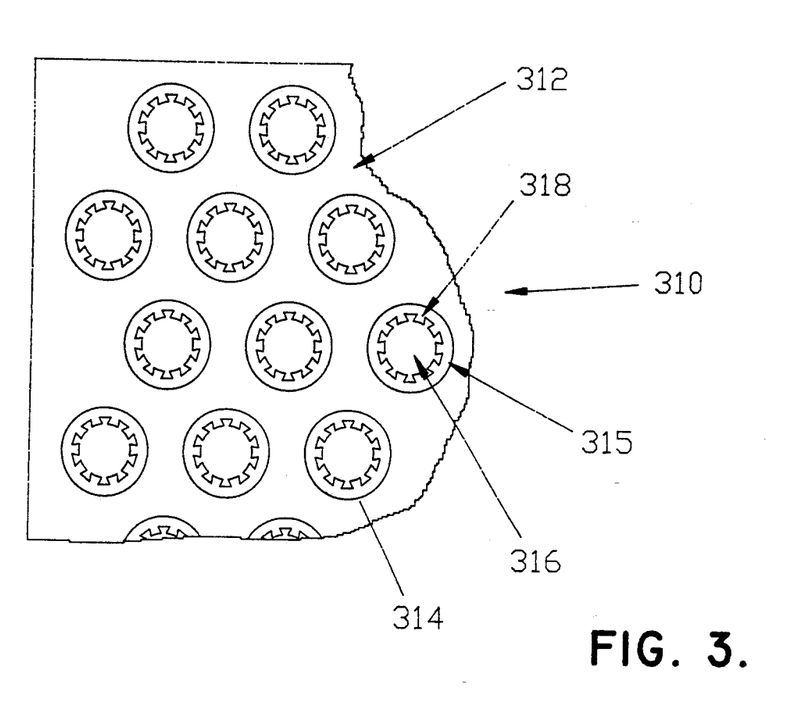
FIG. 3 is a cross-section of a shape memory effect material micro-actuator containing a plurality of circular micro-heat pipes.

FIG. 3 shows the transverse cross-section of a shape memory effect micro-actuator assembly 10A with a plurality of shape memory effect material micro-actuators 10 each containing a micro-heat pipe, within a shape memory effect material effect body 14, containing a vapor space 16 the perimeter of which is made up of capillary arteries 18. The multiple shape memory effect micro-actuators 10 are embedded in an array into a matrix material 12A. Matrix material 12A can be shape memory effect material or a second material selected for other properties, for example its density, elastic modulus, optical properties, damping coefficient, or electrical insulator qualities. The spacing and geometrical arrangement of the shape memory effect micro-actuators 10 relative to each other can assume a variety of one, two or three dimensional configurations all of which are within the intent and spirit of this invention.

Figure 4:
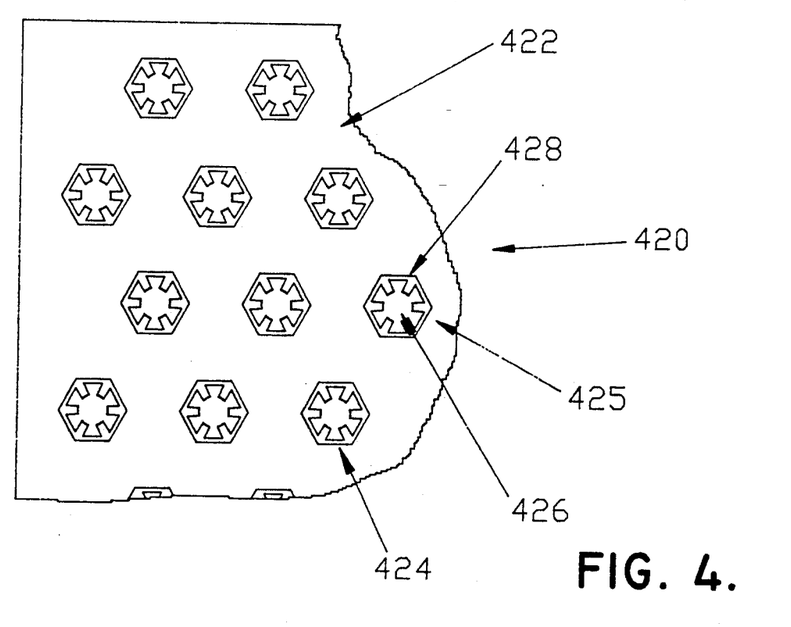
FIG. 4 is a cross-section of a shape memory effect material micro-actuator containing a plurality of hexagonal micro-heat pipes.

The transverse cross-section of another embodiment of the present invention is shown in FIG. 4 where the shape memory effect micro-actuator assembly 20A has a plurality of shape memory effect micro-actuators 20 embedded in an array into a matrix material 22A, each oriented substantially perpendicular to the plane of the cross-section and parallel to each other. Each shape memory effect material micro-actuator has a body 24 and a vapor space 26 surrounded by a at least one capillary artery 28. Matrix material 22A can also be a shape memory effect material or another material selected for other properties as stated above. The hexagonal cross-sectional shape of the bodies 24 allows close packing configurations with a contiguous matrix material 22A passing through the entire assembly 20A.

Figure 5:
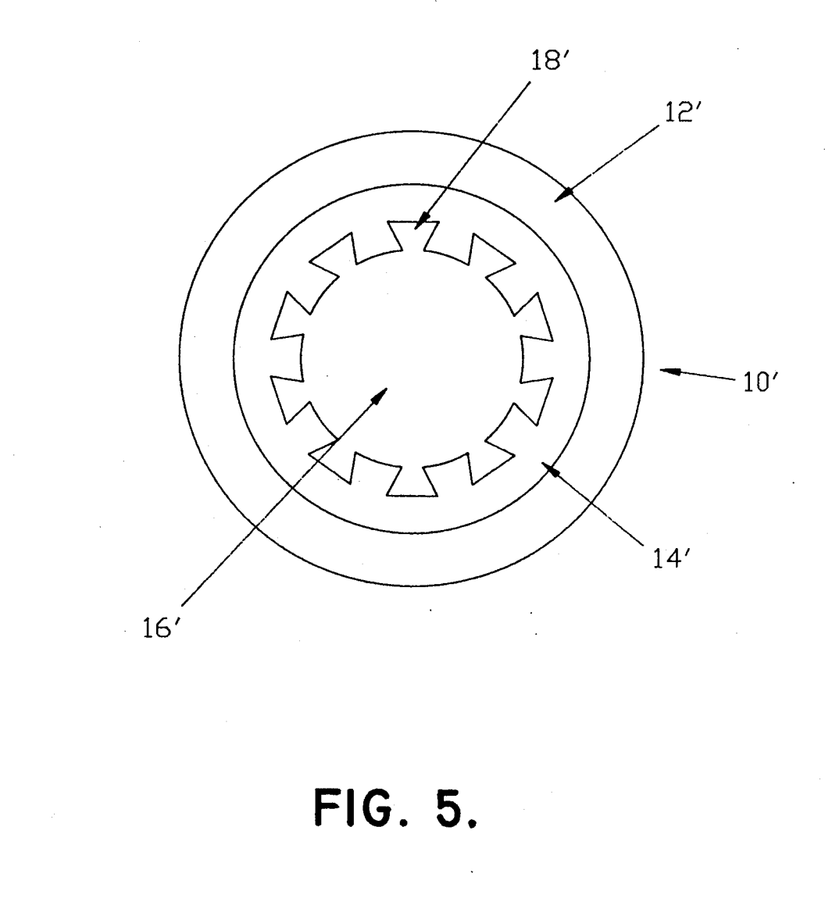
FIG. 5 is a cross-section of a circular micro-actuator made from a shape memory effect material composite structure containing micro-heat pipes in the as-fabricated condition.
Figure 6:
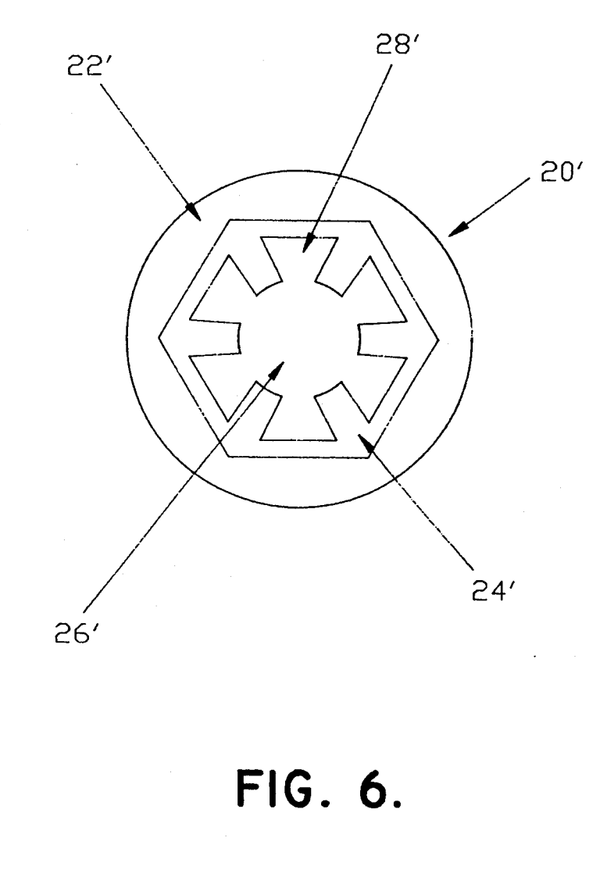
FIG. 6 is a cross-section of a hexagonal micro-actuator made from a shape memory effect material composite in the as-fabricated condition.

FIG. 5 is a cross-section of a circular SME material micro-actuator composite structure 10 consisting of a SME material portion 14 containing a vapor space cavity 16 with one or multiple arteries 18 which are in fluidic communication with the vapor space 16. This substructure 14 is contained within a member 12 which can be either a resilient member for the purpose of returning the SME material actuator to its original shape when cooled below its martensitic temperature or member 12 can be an insulative member which protects the substructure 14 from an external high temperature existing in the surrounding environment. FIG. 6 is another embodiment of the invention showing an alternative shape and artery structure. The embodiment in FIG. 6 provides anisotropic stiffness with the stiffness varying with direction with a six-fold symmetry. This would be useful in vibrational damping applications in robotics.

Figure 7:
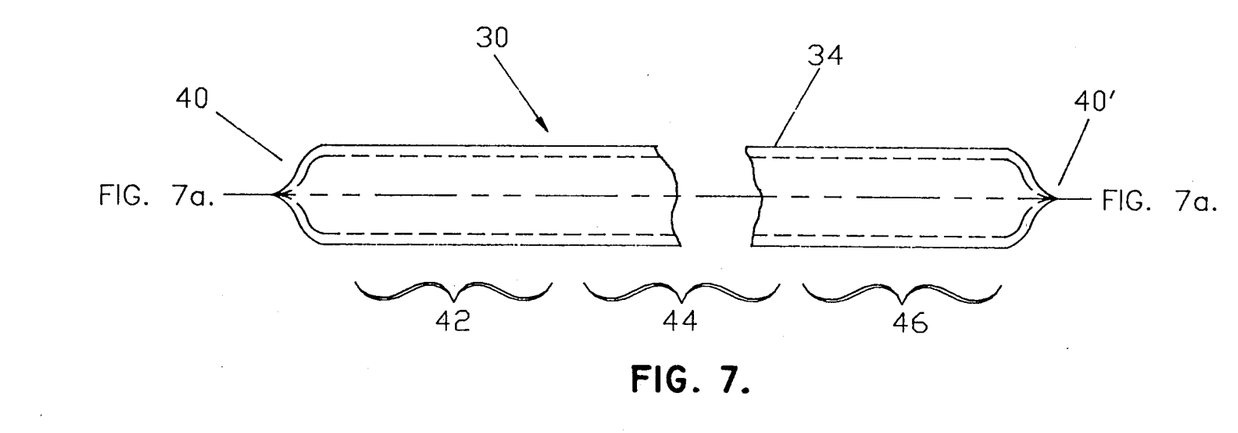
FIGS. 7 and 7a are a longitudinal cross-section of a micro-actuator containing a micro-heat pipe and fabricated from a shape memory effect material.
Figure 7A:
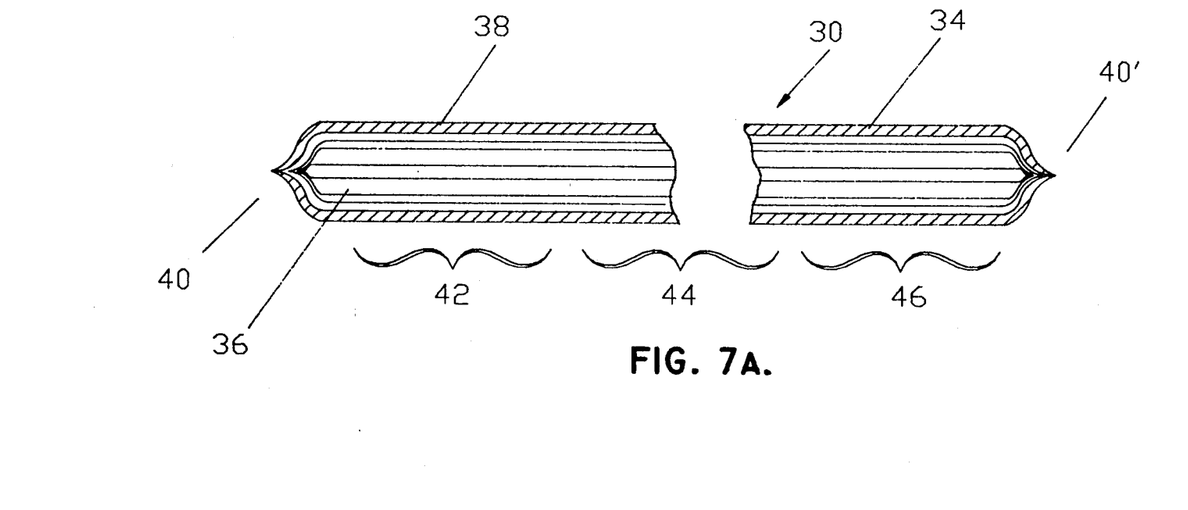

FIG. 7 shows a longitudinal view of a shape memory effect material micro-actuator 30, made up of a body 34 fabricated from a shape memory effect material, body 34 containing a precise quantity of a fluid and sealed at ends 40 and 40'. Typical fluids for the operating temperatures of shape memory effect materials include, among others, ammonia, ethanol, methanol and water. The length of the micro-actuator is divided into an evaporator region 42, an adiabatic region and a condenser region 46. Sealing of ends 40 and 40' can be accomplished by resistance compression welding. Additionally, FIG. 7a shows vapor space 36 and capillary arteries 34 in longitudinal cross-section.

Figure 8:
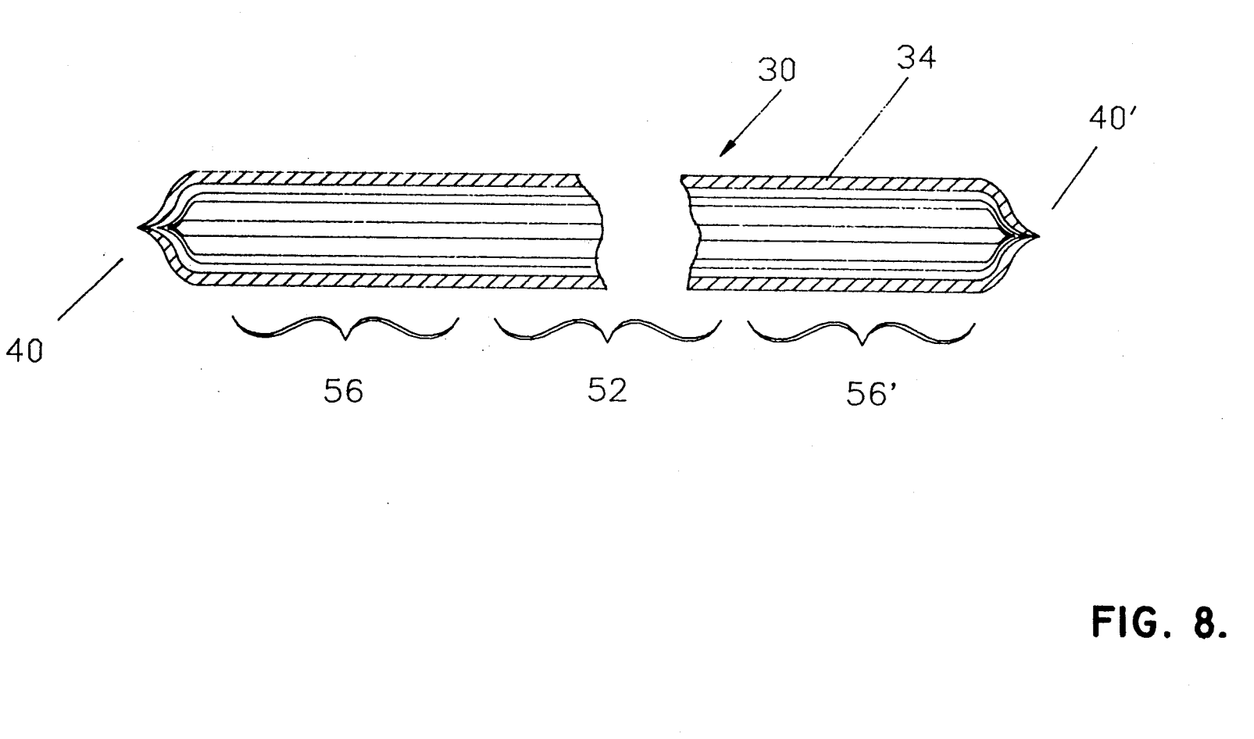
FIG. 8 is a longitudinal cross-section of a micro-actuator containing a micro-heat pipe with a double condenser region and fabricated from a shape memory effect material.

FIG. 8 is a longitudinal cross-section of a SME material micro-actuator containing a micro-heat pipe with a double condenser region 56 and 56' separated by a single evaporator region 52. Multiple sequences of contiguous condenser and evaporator regions can be envisaged as an extension of this figure. Condenser regions can be used for grasping the micro-actuator for the purpose of transmitting force to and from the actuator with heat exiting the device through the grasping mechanism.

Figure 9:
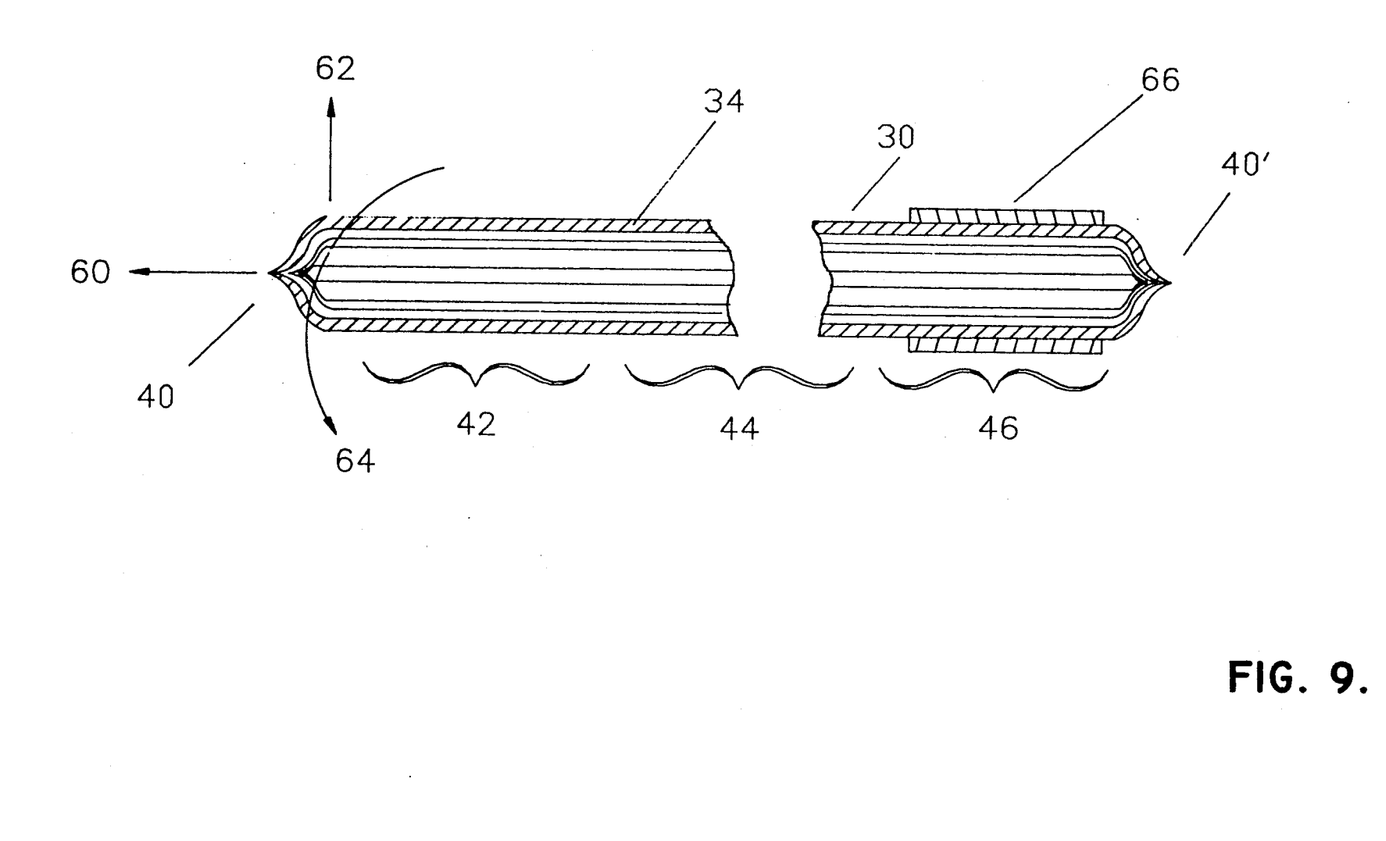
FIG. 9 is a longitudinal cross-section of a micro-actuator containing a micro-heat pipe grasped at one end and undergoing multiple possible deformations at the opposite end.

Deformation of SME material micro-actuators 30 at a first end 40 by tensile force 60, cantilever/shear force 62 or a torque force 64 is shown in FIG. 9 in which the micro-actuator held at a second end 40' by grasping means 66. Tensile force 60, cantilever force 62 and torque force 64 can be applied individually or in combination during the cooling portion of the micro-actuator's thermal cycle when the SME material is in its martensitic state. Likewise, micro-actuator 30 can be formed into a helical configuration (not shown) to maximize the operating distance of the actuator.

OPERATION

FIG. 7a shows a longitudinal cross-sectional view of a shape memory effect micro-actuator 30 containing a micro-heat pipe comprising a vapor space 36 and at least one capillary artery 38 contained within a shape memory effect body 34, evacuated and then sealed at ends 40 and 40' with a precise amount of a working fluid.

Micro-actuator 30 in FIG. 9 is mechanically deformed at a first end 40 by tensile force 60, cantilever/shear force 62 torsional force 64 or a combination thereof while SME material body 34 is below a martensite start temperature $M_s$ in its martensitic state. As evaporator region 42 of shaped memory effect micro-actuator 30 is heated above a second higher temperature termed the austenite finish temperature $A_f$ the SME material transforms to austenite where shape memory effect micro-actuator 30 recovers its original shape.

The heat may be supplied by any means to evaporator region 42, such as radiation, conduction, convection, etc. However, Joule heating is the preferred method since it is fast and relatively uniform throughout cross-section of body 34. Joule heating can be effected by placing an appropriate electrical potential across evaporator region 42 in the principal axial direction as shown in FIG. 7 and 7a. Alternatively, a potential can be placed across ends 40 and 40' provided a thin layer of a second material with a high electrical conductivity is placed over the condenser regions 46, 56 and 56' to shunt the resulting electrical current and thereby avoid heating of these regions. This configuration may have advantages where multiple condenser and evaporator regions are used along the axial dimension of one body 30.

As in known in the art, a shape memory effect actuator can operate in either the uni-directional mode, where the shape memory effect appears only during heating, or the bi-directional mode, where the shape memory effect micro-actuator is trained to return to the preheated shape when it is cooled to its martensitic state.

Cooling of evaporator region 42 is by the working fluid, enclosed within body 34, evaporating from the surfaces of capillary arteries 38 into vapor space 36 within evaporator region 42, thereby absorbing heat. The resulting vapor is carried down vapor space 36 by the resulting pressure difference to condenser region 46 where it condenses releasing the absorbed heat into body 34 and hence to the outside of shape memory effect micro-actuator 30. The condensed fluid is then returned to evaporator region 42 via capillary arteries 38. Alternatively, the micro-actuator 30 may a vapor space 36 oriented with respect to gravity so that the liquid phase is returned to the evaporator region 42 by gravity instead of arteries 38. Such devices are known in the art as thermosyphons.

FIGS. 1 and 2 show transverse cross-sectional views of specific embodiments of capillary arteries 38 as capillary artery 18 and capillary artery 28 and specific embodiments of vapor space 36 as vapor space 16 and vapor space 26. The length of the adiabatic region 44 is determined by the lengths of evaporator region 42, condenser region 46 and the operating conditions of the micro-heat pipe in relation to the overall length of the shape memory effect micro-actuator 30. Depending upon operating conditions, adiabatic region 44 may not exist, that is evaporator region 42 may be contiguous with condenser region 46. (A complete account of heat pipe operation may be found in Dunn and Reay.)

FIG. 8 shows an alternative mode of operation of shape memory effect material micro-actuator 30 in which vapor originating within evaporator region 52 flows via vapor space 36 to condenser regions 56 and 56' each located on one end of micro-actuator 30. As before, the condensed liquid returns from the condenser regions 56 and 56' to evaporator region 52 via capillary arteries 38.

Arrays of SME material micro-actuators 10 and 20 embedded into matrix material 12A and 22A are shown as assemblies 10A and 20A in FIG. 3 and FIG. 4 respectively. The radii of curvature of a two dimensional surface formed from structures 12A or 22A can be adaptively changed by heating or cooling groups of micro-actuators or micro-actuators 20. More specifically, heating of those micro-actuators 10 and 20 near a first principal surface of assemblies 10A and 20A cause a contraction relative to a second and juxaposition principal surface and a deflection of the first into a concave shape. Micro-actuators 10 and 20 near the second principal surface, not being heated, are in their martensitic state and are easily deformed offering little resistance to the deformation. The curvature of assemblies 10A and 20A can be reversed, i.e. The first principal surface becoming convex and the second principal surface becoming concave by cooling the micro-actuators 10 and 20 nearest the first principal surface and heating micro-actuators 10 and 20 nearest the second principal surface. The temporal response of this structure is enhanced by this invention wherein heat is removed via internal micro-heatpipe cooling within the micro-actuators 10 and 20 themselves.

Operation may be extended to surfaces with two radii of curvature by forming a grid of orthogonal micro-actuators 10 and 20 in assemblies 10A and 20A. Each direction of the grid will define one radii of curvature with operation as described above.

Accordingly, the reader Will see that the shape memory effect material micro-actuators of this invention can be used to actuate a wide variety of apparatuses without the current limitations of external cooling means. Specifically, the current invention provides SME material actuators which have faster response times, can operate in high temperature environments, may incorporate an integral resilient member, exhibit low thermal hysteresis and fatigue, can be fabricated in large cross-sections without degradation in performance, and can be incorporated into composite materials to provide rapidly actuated surfaces. Thus the invention applies to all SME material applications where fast response, large forces from large actuators or environmental conditions currently limit present application of SME material actuators.

While my above description contains many specificies, these should not be construed as limitations on the scope of the invention, but rather as an exemplification of one preferred embodiment thereof. Many other variations are possible. For example, the micro-heat pipe cross-section may assume many configurations wherein passages are provided for vapor and liquid flow, including simple shapes such as triangles in which the liquid flows in the interstices of the corners and the vapor in the center. Alternatively, the micro-heat pipes can comprise a conduit with a wick material around the periphery and a central vapor space as is known in the art. Likewise, the distribution of SME material micro-actuators within a second material can assume a wide variety of distributions, including placing the micro-actuators near the surface and thus far from the neutral axis so that the induced bending moment is maximized.

Accordingly, the scope of the invention should not be limited to the embodiments illustrated, but by the broader appended claims and their legal equivalents.

What is claimed is:

1. A rapid shape memory effect micro-actuator with internal cooling means, comprising:
   (a) a body fabricated from a shape memory effect material;

(b) at least one micro-heat pipe contained within said body;

(c) heating means for at least one portion of said body;

(d) cooling means for at least one portion of said body complementary to said heated portions of said body;

whereby said micro-actuator operates during a cooling portion of its thermal/mechanical cycle by transporting thermal energy from the heating portion to the cooling portion internally.

2. A micro-actuator according to claim wherein said body is comprised of a composite of two integrally joined materials in mechanical communication:

(a) at least one shape memory effect material portion, and;

(b) at least one resilient material portion;

whereby said micro-actuator operates in a direction due to the action of said shape memory material portion of the body and in the reverse of said direction due to the action of said resilient material portion of the body.

3. A micro-actuator according to claim 1, wherein all or a portion of said body is surrounded by a thermally insulative material whereby said internally cooled micro-actuator is able to operate in environments with temperatures higher than that at which the said shape memory material portion of said micro-actuator would otherwise be capable of operating.

4. A micro-actuator according to claim wherein said micro-actuator upon heating deflects in a direction due to the action of said shape memory material portion of the body and upon cooling deflects in the reverse of said direction due an external force means.

5. A micro-actuator according to claim 1, wherein portions of said micro-actuator integrally contact a high-electrical conductivity member serving to shunt Joule heating current whereby said portions of microactuator remain cool and act as condenser ends of embedded micro-heat pipes receiving heat from contiguous heating portions of said micro-actuator.

6. A micro-actuator according to claim 1, wherein said micro-heat pipes comprise a central conduit transferring thermal energy from the heating portions to the cooling portions as thermosyphons.

7. A micro-actuator according to claim 1 wherein the micro-actuator is a linear actuator.

8. A micro-actuator according to claim 1 wherein the micro-actuator is a torsional actuator.

9. A micro-actuator according to claim 1 wherein the micro-actuator is a cantilever actuator.

10. A micro-actuator according to claim 1 wherein the micro-actuator has a helical configuration.

11. A micro-actuator according to claim wherein said micro-actuator is bi-directionally trained to deflect in a direction upon heating and deflect in reverse of said direction upon cooling.

12. A rapidly actuated composite structure comprising:

(a) A plurality of rapid shape memory effect microactuators, with internal cooling means, each comprising:

(i) a first body fabricated from a shape memory effect material;

(ii) at least one micro-heat pipe contained within said body;

(iii) heating means for at least one portion of said body;

(iv) cooling means for at least one complementary portion of said body;

(b) said plurality of micro-actuators being embedded within and in mechanical communication with a second body comprising a second material;

whereby the external one, two or three dimensional shape of said second body may be controlled by application of said heating and said cooling means to said plurality of micro-actuators.

13. A rapidly actuated composite structure according to claim 12, wherein said second material has a low thermal conductivity whereby said composite structure can operate in environments with temperatures higher than the austenitic finish temperature of the said shape memory effect material.

14. A rapidly actuated composite structure according to claim 12, wherein the second material provides resilient member means returning said structure to its original shape during a cooling portion of the shape memory effect material thermal cycle.

15. A rapidly actuated composite structure according to claim 12, wherein an external force means returns said structure to its original shape during the cooling portion of the shape memory effect material thermal cycle.

16. A rapidly actuated composite structure according to claim 12, wherein a two dimensional surface changes shape by applying said heating means and said cooling means to selected subgroups of one or more individual micro-actuators of said plurality of micro-actuators, whereby rapid shape changes of said surface are obtained.

17. A micro-actuator according to claim 12, wherein said composite structure is bi-directionally trained to deflect in a direction upon heating and deflect in reverse of said direction upon cooling.

18. A rapid shape memory effect micro-actuator with internal cooling means, comprising a body fabricated from a composite of two integrally joined materials in mechanical communication:

(a) at least one shape memory effect material portion, and;

(b) at least one resilient material portion;

whereby said micro-actuator operates in a direction due to the action of said shape memory material portion of the body and in the reverse of said direction due to the action of said resilient material portion of the body;

(c) at least one micro-heat pipe contained within the shape memory effect material portion of said body;

(d) heating means for at least one portion of said body;

(e) cooling means for at least one portion of said body complementary to said heated portions of said body;

whereby said micro-actuator operates during a cooling portion of its thermal/mechanical cycle by transporting thermal energy from said heating portion to said cooling portion internally.

19. A micro-actuator according to claim 18 wherein the cross-sectional relationship between the two integrally joined materials is non-isotropic whereby actuator response is directionally dependent.

* * * * *